US009864952B2

(12) United States Patent
Bell et al.

(10) Patent No.: US 9,864,952 B2
(45) Date of Patent: Jan. 9, 2018

(54) CONTROLLED QUESTION AND ANSWER KNOWLEDGE SYSTEM MANAGEMENT CONFIRMING CUSTOMER DOES NOT WANT TO TERMINATE/CANCEL SERVICE/RELATIONSHIP

(71) Applicant: GENESYS TELECOMMUNICATIONS LABORATORIES, INC., Daly City, CA (US)

(72) Inventors: Cliff W. Bell, Daly City, CA (US); Daniel S. Stoops, Daly City, CA (US)

(73) Assignee: GENESYS TELECOMMUNICATIONS LABORATORIES, INC., Daly City, CA (US)

( * ) Notice: Subject to any disclaimer, the term of this patent is extended or adjusted under 35 U.S.C. 154(b) by 602 days.

(21) Appl. No.: 14/449,018

(22) Filed: Jul. 31, 2014

(65) Prior Publication Data

US 2015/0347900 A1 Dec. 3, 2015

Related U.S. Application Data

(60) Provisional application No. 62/003,486, filed on May 27, 2014.

(51) Int. Cl.
*G06F 17/00* (2006.01)
*G06N 5/02* (2006.01)
(Continued)

(52) U.S. Cl.
CPC ......... *G06N 5/02* (2013.01); *G06F 17/30654* (2013.01); *G06N 5/048* (2013.01);
(Continued)

(58) Field of Classification Search
CPC ...................................................... H04M 3/51
(Continued)

(56) References Cited

U.S. PATENT DOCUMENTS 8,275,117 B2 9/2012 Huet et al.
2002/0118815 A1\* 8/2002 Andersen ................ H04M 3/60
379/265.02

(Continued)

FOREIGN PATENT DOCUMENTS

KR 20020069761 A 5/2002
KR 10-1195872 B1 10/2012

OTHER PUBLICATIONS

International Search Report and Written Opinion for PCT/US2015/032701, dated Aug. 31, 2015, 15 pages.

*Primary Examiner* — David Vincent
(74) *Attorney, Agent, or Firm* — Lewis Roca Rothgerber Christie LLP

(57) ABSTRACT

In a system for knowledge system management, the system includes: a processor; and a memory coupled to the processor, wherein the memory has stored thereon instructions that, when executed by the processor, cause the processor to: receive a question from a customer; determine whether or not the question satisfies a first criterion for obtaining an automated response to the question; in response to determining that the question satisfies the first criterion, transmit the question to a knowledge system for generating automated responses to questions; receive the automated response to the question from the knowledge system; determine whether or not the automated response satisfies a second criterion for providing the automated response to the customer; and in response to determining that the automated response satisfies the second criterion, transmit the automated response to an electronic device operated by the customer.

18 Claims, 12 Drawing Sheets
(4 of 12 Drawing Sheet(s) Filed in Color)

(51) Int. Cl.
*G06N 5/04* (2006.01)
*G06F 17/30* (2006.01)
*G06Q 30/02* (2012.01)
*H04L 12/58* (2006.01)

(52) U.S. Cl.
CPC ......... *G06Q 30/0203* (2013.01); *H04L 51/02* (2013.01); *G06N 5/04* (2013.01)

(58) Field of Classification Search
USPC .................................................. 706/15, 45
See application file for complete search history.

(56) References Cited

U.S. PATENT DOCUMENTS

| | | |
|---|---|---|
| 2003/0028448 A1 | 2/2003 | Joseph et al. |
| 2005/0187913 A1 | 8/2005 | Nelken et al. |
| 2009/0013255 A1* | 1/2009 | Yuschik ................. G06F 3/038 715/728 |
| 2013/0223600 A1 | 8/2013 | Sharp |
| 2014/0288932 A1* | 9/2014 | Yeracaris ................ G10L 15/30 704/249 |
| 2015/0049869 A1* | 2/2015 | Petrovykh ........... H04M 3/5158 379/265.09 |
| 2015/0324805 A1* | 11/2015 | Skiba .................... G06Q 30/00 705/7.13 |

* cited by examiner

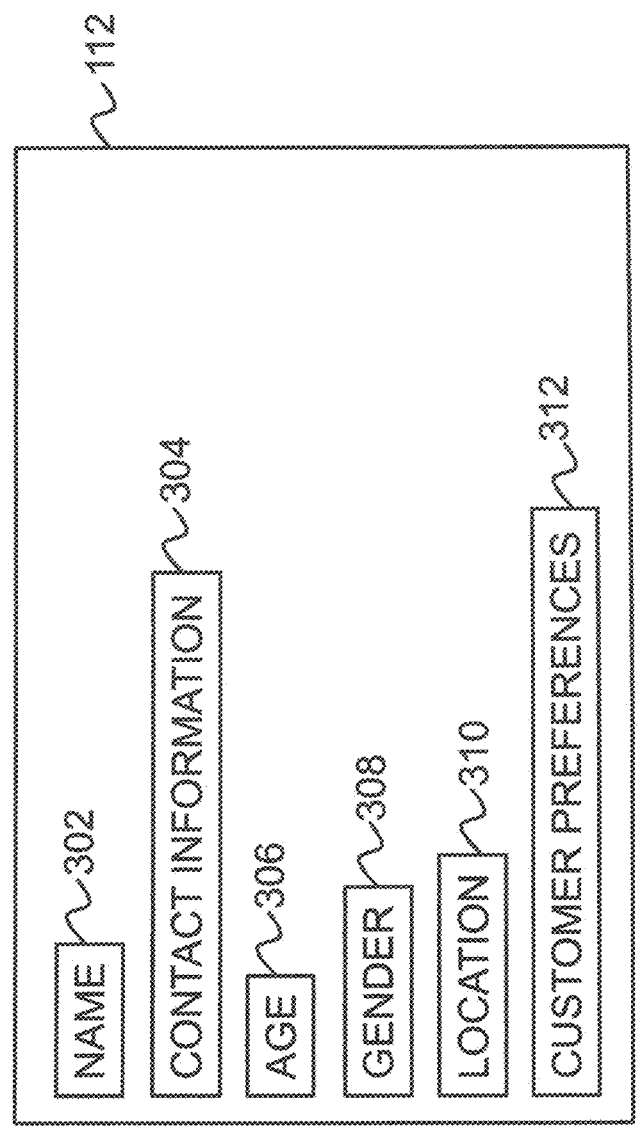

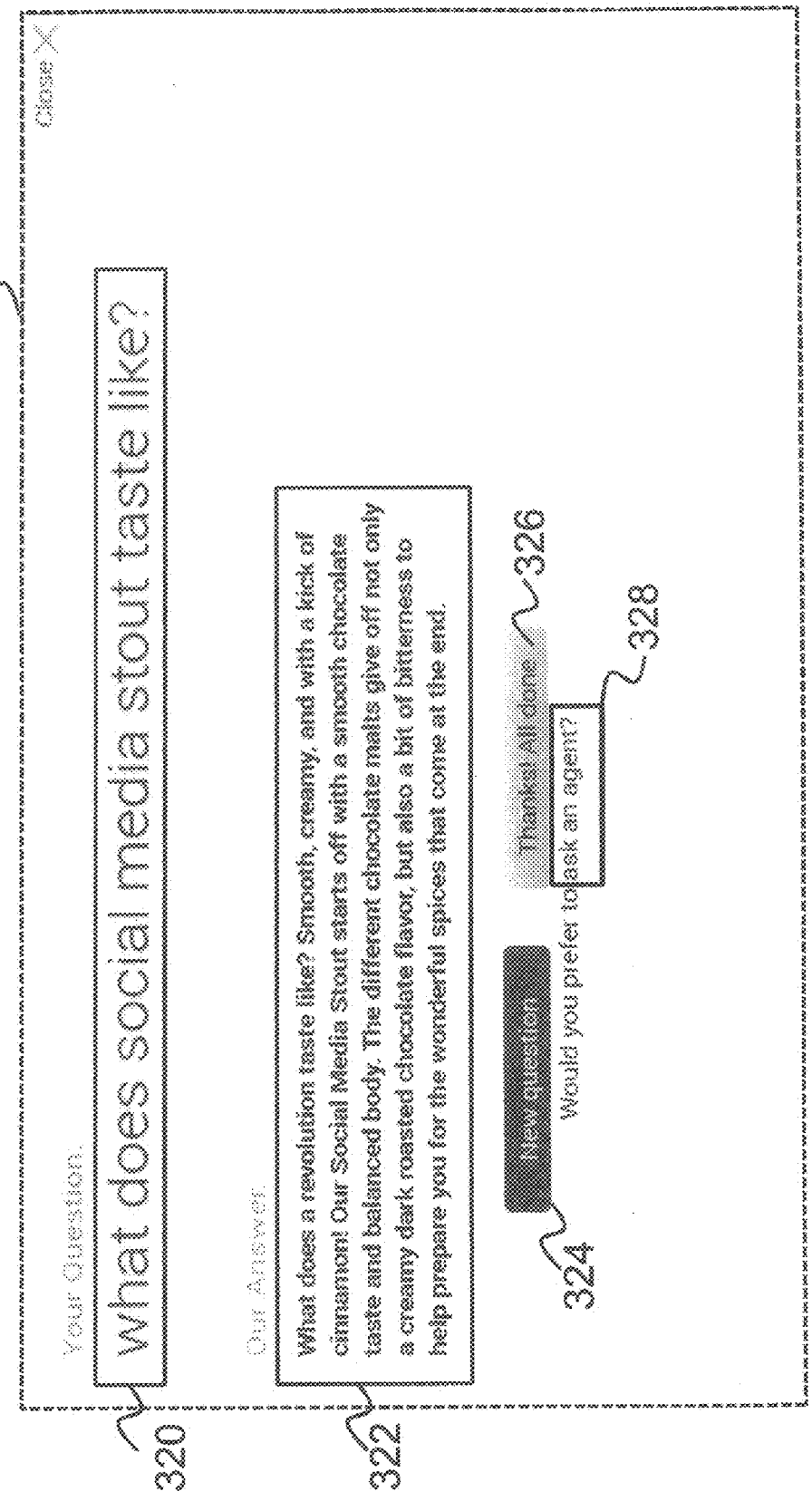

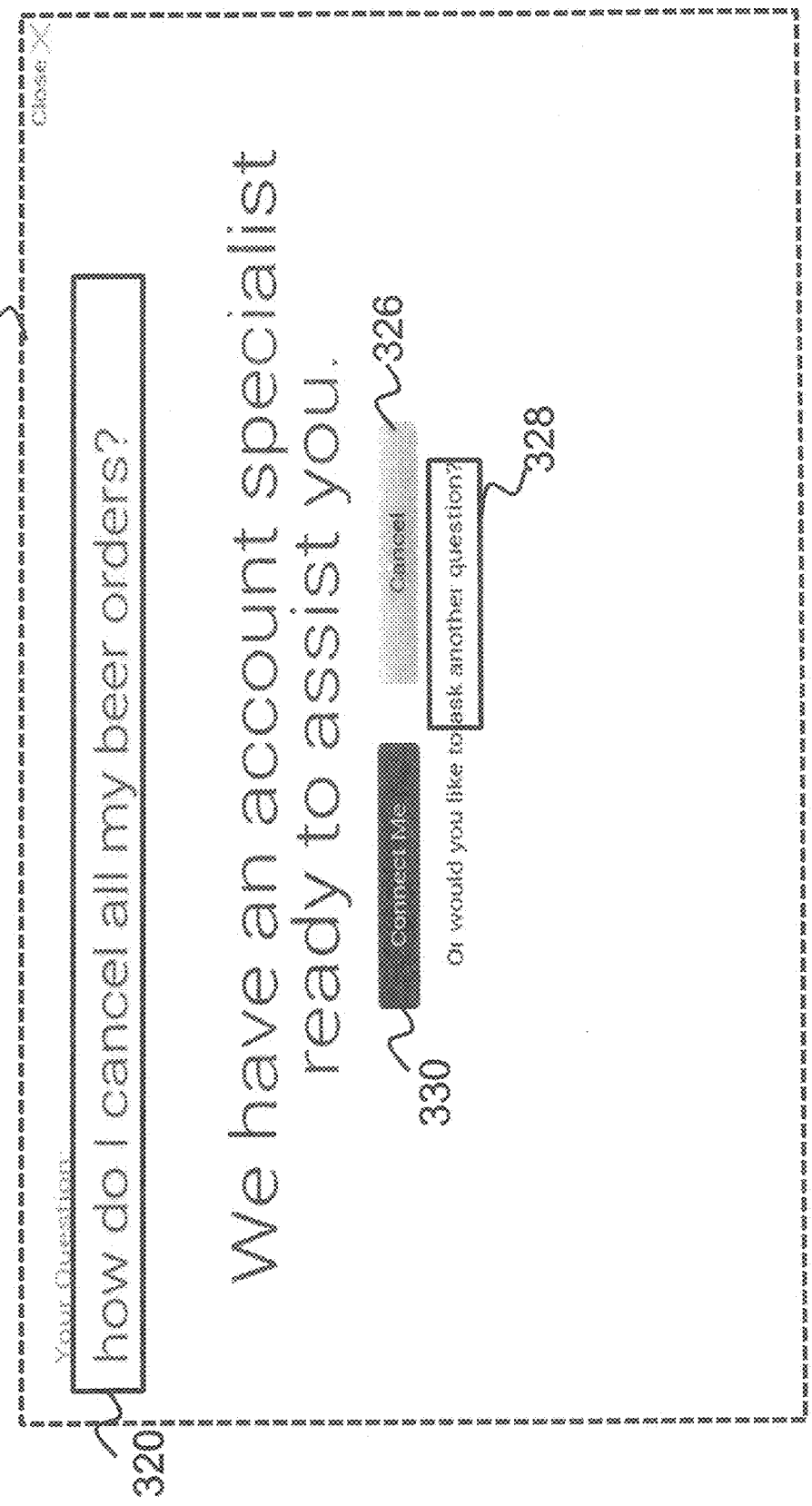

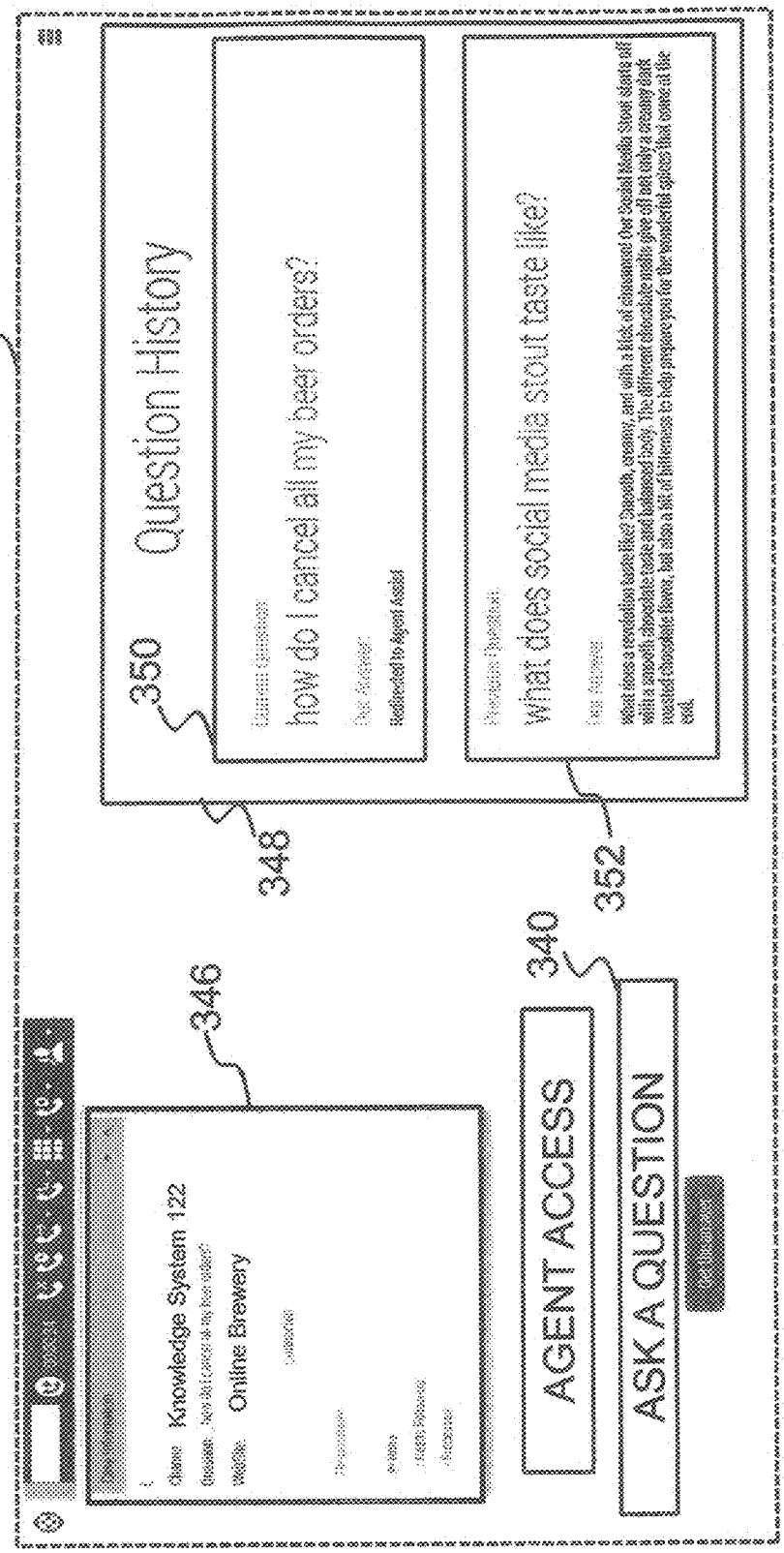

CONTROLLED QUESTION AND ANSWER KNOWLEDGE SYSTEM MANAGEMENT CONFIRMING CUSTOMER DOES NOT WANT TO TERMINATE/CANCEL SERVICE/RELATIONSHIP

CROSS-REFERENCE TO RELATED APPLICATION

The present application claims priority to and the benefit of Provisional Application No. 62/003,486, filed on May 27, 2014, entitled "System and Method for Controlled Knowledge System Management", the entire content of which is incorporated herein by reference.

FIELD

Aspects of embodiments of the present invention relate to a system and method for controlled knowledge system management.

BACKGROUND

In many markets of the modern commerce system, businesses must look for every opportunity to provide high quality products and services while minimizing costs wherever possible in order to remain competitive. As part of their business objectives, many businesses aim to provide customers with a platform for asking questions or providing feedback about products or services. The cost and infrastructure for employing and training enough employees and agents to service every customer with a question may be very expensive or even cost prohibitive. Thus, there is a need to provide businesses with automated tools to facilitate communication with customers, and to provide customers with the information they desire, while also facilitating low cost, high efficiency, and high profitability for the businesses.

SUMMARY

Aspects of embodiments of the present invention include a system and method for controlled knowledge system management.

According to embodiments of the present invention, in a system for knowledge system management, the system includes: a processor; and a memory coupled to the processor, wherein the memory has stored thereon instructions that, when executed by the processor, cause the processor to: receive a question from a customer; determine whether to not the question satisfies a first criterion for obtaining an automated response to the question; in response to determining that the question satisfies the first criterion, transmit the question to a knowledge system for generating automated responses to questions; receive the automated response to the question from the knowledge system; determine whether or not the automated response satisfies a second criterion for providing the automated response to the customer; and in response to determining that the automated response satisfies the second criterion, transmit the automated response to an electronic device operated by the customer.

The instructions may further cause the processor to determine contextual information regarding the question.

The contextual information may include a topic trend of the question.

The contextual information may include stored profile information regarding the customer.

The instructions may further cause the processor to transmit the contextual information to the knowledge system along with the question.

The first criterion may include a determination that the customer does not wish to terminate a customer relationship.

The second criterion may include a confidence level for an accuracy of the automated response being above a predetermined threshold.

The instructions may further cause the processor to route a communication link with the electronic device operated by the customer to an agent device in response to determining that the automated response does not satisfy the second criterion.

The second criterion may include the automated response being shorter than a predetermined length.

The instructions may further cause the processor to route a communication link with the electronic device operated by the customer to an agent device in response to determining that the question does not satisfy the first criterion.

According to embodiments of the present invention, in a method for knowledge system management, the method includes: receiving, by a processor, a question from a customer; determining, by the processor, whether to not the question satisfies a first criterion for obtaining an automated response to the question; in response to determining that the question satisfies the first criterion, transmitting, by the processor, the question to a knowledge system for generating automated responses to questions; receiving, by the processor, the automated response to the question from the knowledge system; determining, by the processor, whether or not the automated response satisfies a second criterion for providing the automated response to the customer; and in response to determining that the automated response satisfies the second criterion, transmitting, by the processor, the automated response to an electronic device operated by the customer.

The method may further include determining, by the processor, contextual information regarding the question.

The contextual information may include a topic trend of the question.

The contextual information may include stored profile information regarding the customer.

The method may further include transmitting, by the processor, the contextual information to the knowledge system along with the question.

The first criterion may include a determination that the customer does not wish to terminate a customer relationship.

The second criterion may include a confidence level for an accuracy of the automated response being above a predetermined threshold.

The method may further include routing, by the processor, a communication link with the electronic device operated by the customer to an agent device in response to determining that the automated response does not satisfy the second criterion.

The second criterion may include the automated response being shorter than a predetermined length.

The method may further include routing, by the processor, a communication link with the electronic device operated by the customer to an agent device in response to determining that the question does not satisfy the first criterion.

BRIEF DESCRIPTION OF THE DRAWINGS

The patent or application file contains at least one drawing executed in color. Copies of this patent or patent application with color drawings will be provided by the Office upon request and payment of the necessary fee.

A more complete appreciation of the present invention, and many of the attendant features and aspects thereof, will become more readily apparent as the invention becomes better understood by reference to the following detailed description when considered in conjunction with the accompanying drawings in which like reference symbols indicate like components, wherein:

FIGS. 3A-3E illustrate example user interfaces of the knowledge management control system according to some embodiments of the present invention;

DETAILED DESCRIPTION

Figure 1:
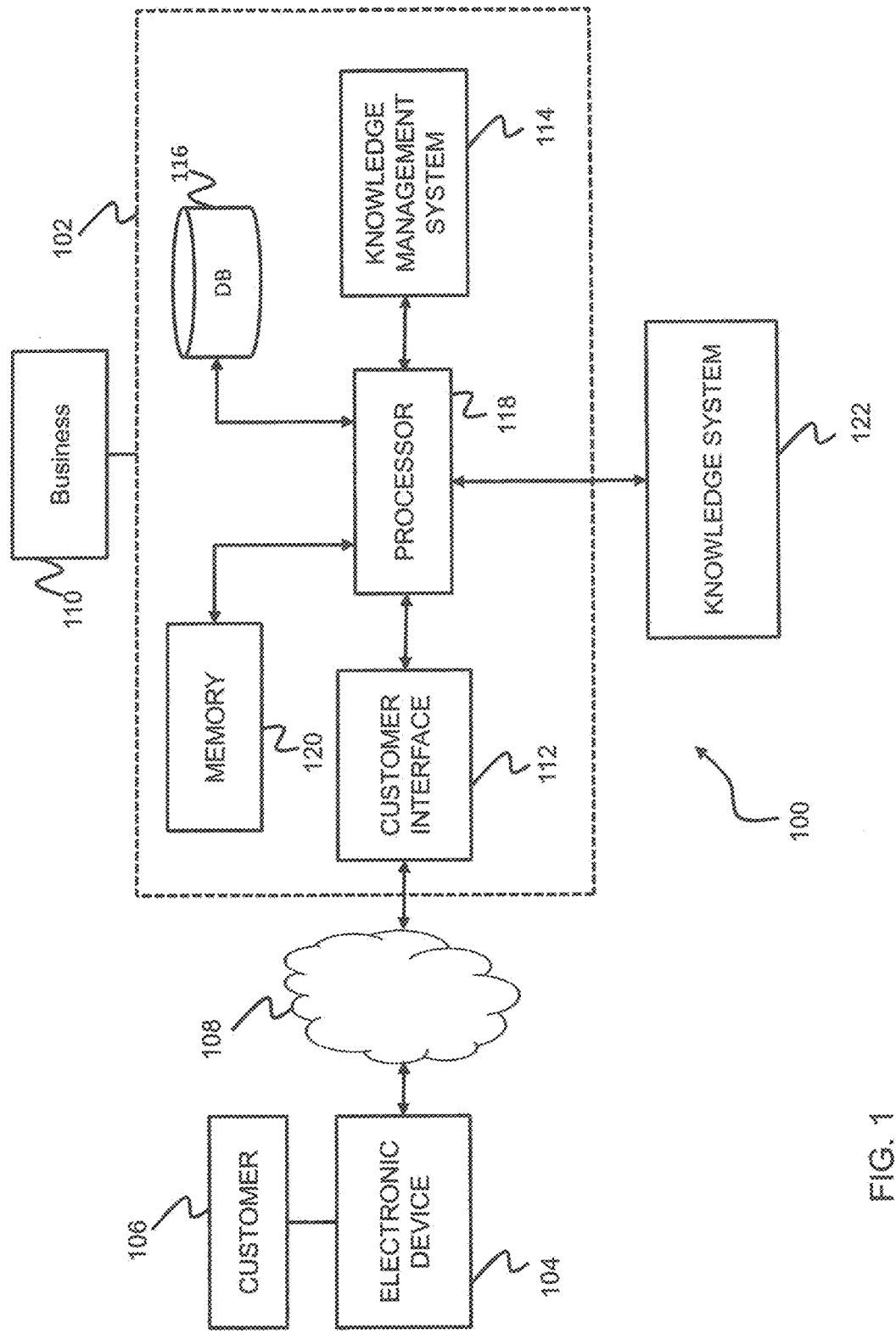
FIG. 1 illustrates a schematic block diagram of a knowledge management control system according to some embodiments of the present invention.

The present invention is described in one or more embodiments in the following description with reference to the figures, in which like numerals represent the same or similar elements. While the invention is described in terms of the best mode for achieving the invention's objectives, it will be appreciated by those skilled in the art that it is intended to cover alternatives, modifications, and equivalents as may be included within the spirit and scope of the invention as defined by the appended claims and their equivalents as supported by the following disclosure and drawings.

In general terms, embodiments of the present invention are directed to a system and method for controlled knowledge management.

In recent years, many businesses have adopted the use of knowledge systems as an automated tool for providing customers with information about the businesses' products and/or services. A knowledge system operates by receiving a question, for example, in natural language (e.g., from a website interface, mobile application interface, voice recordings, or any other suitable interface for providing questions to the knowledge system), and using a language analysis tool or algorithm to determine the meaning of the question, and then using various information resources (e.g., encyclopedias, dictionaries, publicly available websites, documents submitted to the knowledge system, etc.) to return an answer to the question. The answer may also include references to source material citations, a confidence level regarding the accuracy of the answer, related answers, and the ability for the user to rate the quality of the response so that the knowledge system can improve future responses.

Thus, in the interest of cost efficiency, a business may direct a voice or text-based question from a customer to a knowledge system operated internally or by a third party in order to automate question and answer communication sessions. The answer generated by the knowledge system may be provided directly to the customer as a way to answer the customer's question without incurring the additional costs for maintaining the infrastructure to have a live human agent answer the customer's question.

One potential risk with employing a knowledge system to answer customer's questions and respond to customer feedback, however, is that a knowledge system may provide an answer to the customer's question that does not align with the business objectives of the business. For example, if a customer asks a knowledge system how to cancel a service contract or an order, the knowledge system may provide a detailed answer for cancelling the service contract without taking into account the business's interest in retaining the customer, or even the customer's interest resolving his or her frustrations.

Additionally, in many circumstances, a customer will choose to escalate a communication session to a live agent after engaging with a knowledge system. The knowledge system, however, may not keep track of customer profile information or the history of the customer's prior questions and answers, both of which may help to determine potential topic trends based on the questions, or to prevent the customer from having to repeat the same question to an agent.

Accordingly, embodiments of the present invention operate to impose a business decision process on the automated question and answer knowledge system in order to provide high quality service to the customer and simultaneously protect the business interests of businesses.

Additionally, according to embodiments of the present invention, a business may be able to quickly and simply adapt the business rules that are applied to the automated knowledge management system. These rules can even extend into a contact center setting to facilitate assessing the availability of agents to intervene in the question and answer process.

Additionally, embodiments of the present invention may enable the businesses to automate aspects of their customer support, while simultaneously reducing the risk that valuable customers will be assisted to leave the company, downgrade service, or be given information that allows them to easily lower the value of their customer relationship to the business.

FIG. 1 is a schematic block diagram of a knowledge management control system 100 according to some embodiments of the present invention. The knowledge management control system 100 includes a knowledge management server 102 coupled to (i.e., in electronic communication with) an end-user electronic device 104 operated by a customer 106 over a data communications network 108 such as, for example, a local area network or a wide area network (e.g., a public Internet). The knowledge management server 102 may be operated by a business 110 (e.g., a retailer or service provider) offering certain product lines or services to the customer 106 as part of the commerce system. The knowledge management server 102 includes one or more software modules (e.g., customer interface 112 and knowledge management system 114, described in more detail below) for coordinating communication with the customer 106 by way of the electronic device 104 and the network 108 during a communication session occurring in the knowledge management control system 100.

The knowledge management server 102 is also coupled to a mass storage device or database 116 such as, for example, a disk drive, drive array, flash memory, magnetic tape, or other suitable mass storage device for storing information used by the knowledge management server 102. For example, the mass storage device 116 may store profile information about the customer 106 operating the electronic device 104, communication history information related to products or services provided by the business 110, and other contextual information regarding the customer 106 that may be relevant to the business 110 for engaging in effective and profitable interactions with the customer 106.

The knowledge management server 102 further includes a processor or central processing unit (CPU) 118, which executes program instructions and interacts with other system components to perform various methods and operations according to embodiments of the present invention. The CPU 118 may include (or be in electronic communication with), for example, a graphics processing unit (GPU) for processing signals and data to display images on a display.

The knowledge management server 102 further includes a memory 120, which operates as an addressable memory unit for storing software instructions to be executed by the CPU 118. The memory 120 is implemented using any suitable memory device, such as a random access memory (RAM), and may additionally operate as a computer-readable storage medium having non-transitory computer readable instructions stored therein that when executed by a processor cause the processor to control and manage a communication between the electronic device 104, the customer interface 112, and a knowledge system 122.

According to one embodiment of the invention, the electronic device 104 may connect to the data communications network 108 using a telephone connection, satellite connection, cable connection, radio frequency communication, or any suitable wired or wireless data communication mechanism. To this end, the electronic device 104 may take the form of a personal computer (PC), hand-held personal computer (HPC), television and set-top-box combination, personal digital assistant (FDA), tablet or touch screen computer system, telephone, cellular telephone, smartphone, or any suitable consumer electronics device.

The knowledge management server 102 includes a customer interface module 112, for providing customers with an interface for communicating with the business 110. For example, the customer interface module 112 may be an online storefront, in which the customer 106 can create a profile, order products and/or services, interact with employees or agents of the business 110, or otherwise engage in commercial transactions with the business 110 over the communications network 108. Additionally, the customer interface 112 includes an interface for enabling customers to ask questions and receive answers regarding various aspects of the business 110 and products and/or services provided by the business 110. For example, the customer interface module 112 may take the form of a website or internet-connected application that includes a text field for the customer to type a question about a particular product in free-form text, in order to receive an answer displayed on the electronic device 104 or to connect with a live human agent of the business 110. In one embodiment the customer interface module 112 includes an interface for receiving questions from the customer in the form of audio data. Additionally, the customer interface module 112 may be a plugin or script that can be inserted or incorporated into an existing internet website to enable the customer 106 to engage with the knowledge management system 114 at a time that is convenient (e.g., while browsing products or services on the website of the business 110).

The knowledge management server 102 further includes a knowledge management system or module 114 for controlling and facilitating the flow of data and information to the electronic device 104 from the knowledge system 122. The knowledge system 122 is a computer system capable of receiving questions and providing an answer as output. According to some example embodiments, the knowledge system 122 may be embodied as IBM Watson®. Of course, any other knowledge system may be used as will be appreciated by a person having ordinary skill in the art. In some embodiments, the knowledge system 122 is an artificially intelligent computer system capable of answering questions posed in natural language by retrieving information from information sources such as encyclopedias, dictionaries, newswire articles, literary works, or other documents submitted to the knowledge system 122 as reference materials, as is well known in the art.

The knowledge management system 114 operates within the knowledge management control system 100 to facilitate receiving questions from the customer 106, submitted by way of the electronic device 104 and the customer interface 112, submitting the questions to the knowledge system 122 if helpful for the business 110, and providing feedback or a response to the customer 106 based on an automated response to the customer's questions provided by the knowledge system 122. The knowledge management system 114 additionally facilitates routing the communication with the electronic device 104 to a live human agent of the business 110, depending on the question asked by the customer 106, the contextual information related to the question, and/or the response provided by the knowledge system 122. The operation of the knowledge management system 114 within the knowledge management control system 100 will be explained in more detail below.

Figure 2:
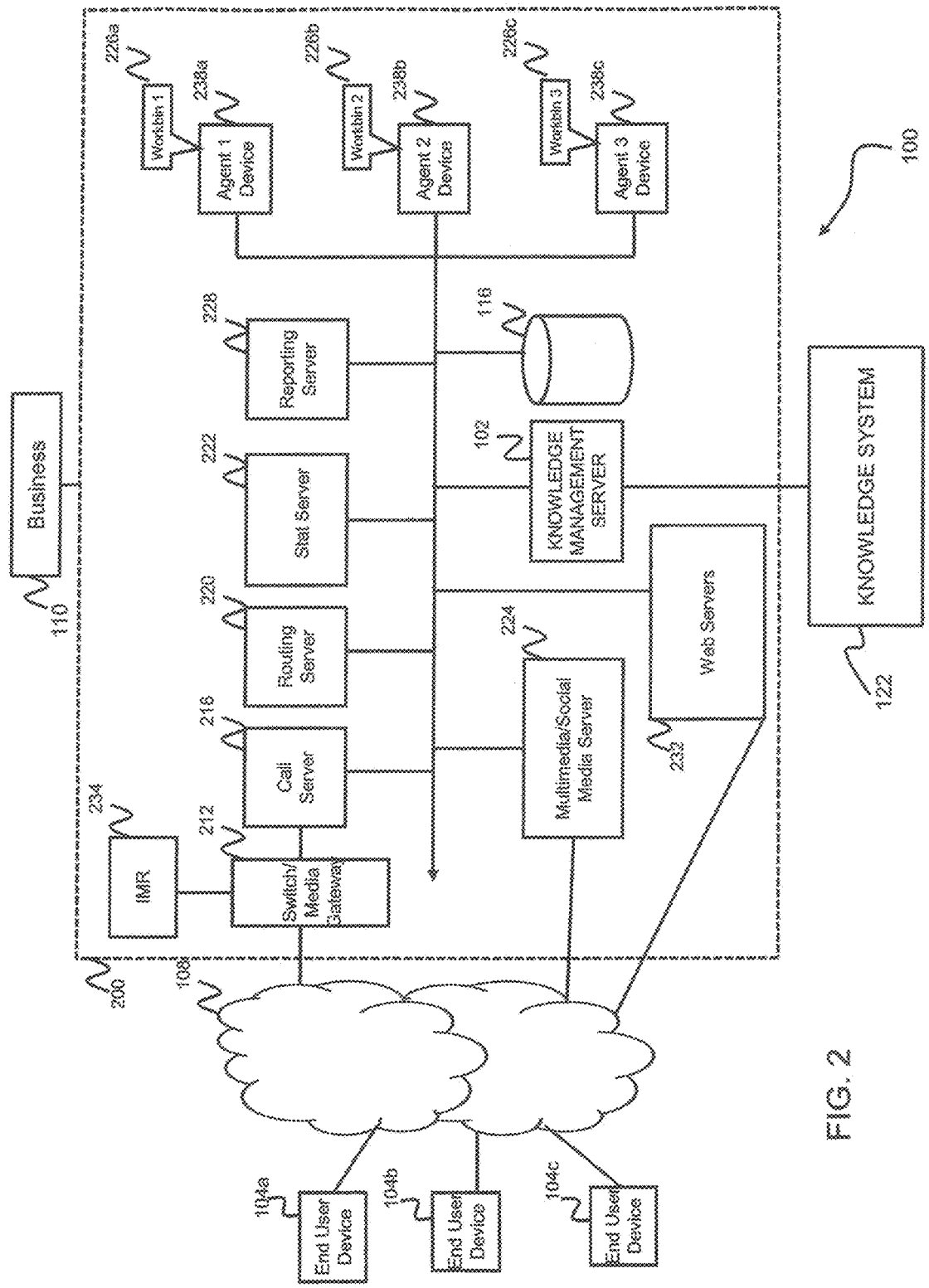
FIG. 2 illustrates further detail of a knowledge management control system operating in conjunction with a contact center environment according to some embodiments of the present invention.

FIG. 2 is a more detailed block diagram of the knowledge management control system 100 according to some embodiments of the present invention. In some embodiments, the business 110 may additionally support or include a contact center system 200 providing contact center services in furtherance of its business objectives. The contact center may be an in-house facility to a business or corporation for serving the enterprise in performing the functions of sales and service relative to the products and services available through the enterprise. In another aspect, the contact center may be a third-party service provider. The contact center may be deployed in equipment dedicated to the enterprise or third-party service provider, and/or deployed in a remote computing environment such as, for example, a private or public cloud environment with infrastructure for supporting multiple contact centers for multiple enterprises. The various components of the contact center may also be distributed across various geographic locations and computing environments and not necessarily contained in a single location, computing environment, or even computing device.

According to one exemplary embodiment, the contact center includes resources (e.g. personnel, computers, and telecommunication equipment) to enable delivery of services via telephone or other communication mechanisms. Such services may vary depending on the type of contact center, and may range from customer service to help desk, emergency response, telemarketing, order taking, and the like.

Customers, potential customers, or other end users (collectively referred to as customers, e.g., customer 106) desiring to receive services from the contact center system 200 or the business 110 may initiate an inbound communication to the contact center system 200 via their end user devices 104a-104c (collectively referenced as electronic device 104). Each of the electronic devices 104 may be a communication device conventional in the art, such as, for example, a telephone, wireless phone, smart phone, personal computer, electronic tablet, and/or the like. Users operating the electronic devices 104 may initiate, manage, and respond to telephone calls, emails, chats, text messaging, web-browsing sessions, and other multi-media transactions.

Inbound and outbound communications from and to the electronic devices 104 may traverse the telephone, cellular, and/or data communication network 108 depending on the type of device that is being used. For example, the communications network 108 may include a private or public switched telephone network (PSTN), local area network (LAN), private wide area network (WAN), and/or public wide area network such as, for example, the Internet. The communications network 108 may also include a wireless carrier network including a code division multiple access (CDMA) network, global system for mobile communications (GSM) network, and/or any 3G or 4G network conventional in the art.

According to one exemplary embodiment, the contact center system 200 includes a switch/media gateway 212 coupled to the communications network 108 for receiving and transmitting communications between end users and the contact center system 200. The switch/media gateway 212 may include a telephony switch or communication switch configured to function as a central switch for agent level routing within the center. In this regard, the switch 212 may include an automatic call distributor, a private branch exchange (PBX), an IP-based software switch, and/or any other switch configured to receive Internet-sourced calls and/or telephone network-sourced calls. According to one exemplary embodiment of the invention, the switch is coupled to a communication server 218 which may, for example, serve as an adapter or interface between the switch and the remainder of the routing, monitoring, and other communication-handling components of the contact center.

The contact center may also include a multimedia/social media server for engaging in media interactions other than voice interactions with the end user devices 104 and/or web servers 232. The media interactions may be related, for example, to email, vmail (voice mail through email), chat, video, text-messaging, web, social media, co-browsing, and the like. The web servers 232 may include, for example, social interaction site hosts for a variety of known social interaction sites to which an end user may subscribe, such as, for example, Facebook, Twitter, and the like. The web servers may also provide web pages for the enterprise that is being supported by the contact center. End users may browse the web pages and get information about the enterprise's products and services. The web pages may also provide a mechanism for contacting the contact center, via, for example, web chat, voice call, email, web real time communication (WebRTC), or the like.

According to one exemplary embodiment of the invention, the switch 212 is coupled to an interactive media response (IMR) server 234, which may also be referred to as a self-help system, virtual assistant, or the like. The IMR server 234 may be similar to an interactive voice response (IVR) server, except that the IMR server 234 is not restricted to voice, but may cover a variety of media channels including voice. Taking voice as an example, however, the IMR server may be configured with an IMR script for querying customers on their needs. For example, a contact center for a bank may tell customers, via the IMR script, to "press 1" if they wish to get an account balance. If this is the case, through continued interaction with the IMR server 234, customers may complete service without needing to speak with an agent. The IMR server 234 may also ask an open ended question such as, for example, "How can I help you?" and the customer may speak or otherwise enter a reason for contacting the contact center. The customer's response may then be used by the routing server 220 to route the call or communication to an appropriate contact center system 200 resource.

If the communication is to be routed to an agent, the communication may be forwarded to the communication server 218 which interacts with a routing server 220 for finding an appropriate agent for processing the communication. The communication server 218 may be configured to process PSTN calls, VoIP calls, and the like, or other text or non-audio based communications (e.g., chat sessions). For example, the communication server 218 may include a session initiation protocol (SIP) server for processing SIP calls. According to some exemplary embodiments, the communication server 218 may, for example, extract data about the customer interaction such as the customer's telephone number, often known as the automatic number identification (ANI) number, or the customer's internet protocol (IP) address, or email address.

In some embodiments, the routing server 220 may query a customer database, which stores information about existing clients, such as contact information, service level agreement (SLA) requirements, nature of previous customer contacts and actions taken by contact center to resolve any customer issues, and the like. The database may be managed by any database management system conventional in the art, such as Oracle, IBM DB2, Microsoft SQL server, Microsoft Access, PostgreSQL, MySQL, FoxPro, and SQLite, and may be stored in a mass storage device 30. The routing server 220 may query the customer information from the customer database via an ANI or any other information collected by the IMR 234 and forwarded to the routing server by the communication server 218.

Once an appropriate agent is available to handle a communication, a connection is made between the customer and the agent device 238a-238c (collectively referenced as 238) of the identified agent. Collected information about the customer and/or the customer's historical information may also be provided to the agent device for aiding the agent in better servicing the communication. In this regard, each agent device 238 may include a telephone adapted for regular telephone calls, VoIP calls, and the like. The agent device 238 may also include a computer for communicating with one or more servers of the contact center and performing data processing associated with contact center operations, and for interfacing with customers via voice and other multimedia communication mechanisms.

The selection of an appropriate agent for routing an inbound communication may be based, for example, on a routing strategy employed by the routing server 220, and further based on information about agent availability, skills, and other routing parameters provided, for example, by a statistics server 222.

The contact center system 200 may also include a reporting server 228 configured to generate reports from data aggregated by the statistics server 222. Such reports may include near real-time reports or historical reports concerning the state of resources, such as, for example, average waiting time, abandonment rate, agent occupancy, and the like. The reports may be generated automatically or in response to specific requests from a requestor (e.g. agent/administrator, contact center application, and/or the like).

According to one exemplary embodiment of the invention, the routing server 220 is enhanced with functionality for managing back-office/offline activities that are assigned to the agents. Such activities may include, for example, responding to emails, responding to letters, attending training seminars, or any other activity that does not entail real time communication with a customer. Once assigned to an agent, an activity an activity may be pushed to the agent, or may appear in the agent's workbin 226a-226c (collectively referenced as 226) as a task to be completed by the agent. The agent's workbin may be implemented via any data structure conventional in the art, such as, for example, a linked list, array, and/or the like. The workbin may be maintained, for example, in buffer memory of each agent device 238.

According to one exemplary embodiment of the invention, the mass storage device(s) 116 may store one or more databases relating to agent data (e.g. agent profiles, schedules, etc.), customer data (e.g. customer profiles), interaction data (e.g. details of each interaction with a customer, including reason for the interaction, disposition data, time on hold, handle time, etc.), and the like. According to one embodiment, some of the data (e.g. customer profile data) may be provided by a third party database such as, for example, a third party customer relations management (CRM) database. The mass storage device may take form of a hard disk or disk array as is conventional in the art.

The contact center system 200 may additionally include the knowledge management server 102 as described above with respect to FIG. 1 for facilitating interactions between customers operating the end user devices 104a-104c and the knowledge system 122.

The various servers of FIG. 2 may each include one or more processors executing computer program instructions and interacting with other system components for performing the various functionalities described herein. The computer program instructions are stored in a memory implemented using a standard memory device, such as, for example, a random access memory (RAM). The computer program instructions may also be stored in other non-transitory computer readable media such as, for example, a CD-ROM, flash drive, or the like. Also, although the functionality of each of the servers is described as being provided by the particular server, a person of skill in the art should recognize that the functionality of various servers may be combined or integrated into a single server, or the functionality of a particular server may be distributed across one or more other servers without departing from the scope of the embodiments of the present invention.

In the various embodiments, the terms interaction and communication are used generally to refer to any real-time and non-real time interaction that uses any communication channel including, without limitation telephony calls (PSTN or VoIP calls), emails, vmails (voice mail through email), video, chat, screen-sharing, text messages, social media messages, web real-time communication (e.g. WebRTC calls), and the like.

FIGS. 3A-3E are screen shots of example user interfaces of the knowledge management control system according to embodiments of the present invention. Although the embodiment shown in FIGS. 3A-3E is in the context of a brewery business, the invention is not limited to such examples. Instead, the embodiment illustrated in FIGS. 3A-3E are intended to be illustrative of an example user interface in which a customer can ask questions and receive answers using the customer interface 112 to interact with the knowledge management system 114, and the knowledge management system 114 may forward the questions to the knowledge system 122 or route the communication to a human agent according to the question and the contextual information related to the question.

According to some embodiments customer may engage in chat communications with the knowledge management system 114 by way of a chat communication interface until it is appropriate, according to the business interests of the business 110 (for example, when the confidence level of a response provided by the knowledge system 122 is low, or the business wishes to influence the behaviors of the customer), to escalate the chat communication to a live agent. Such escalation to a live agent may be performed transparently, such that the customer is unaware that he or she is initially communicating with the knowledge management system 114 prior to the escalation to the live agent and is unaware of the transition to the live agent.

To interact with the knowledge management server 102, the customer 106 may first create an account and profile with the knowledge management server 102, for example, using the electronic device 104 to access the customer interface 112, which may be an Internet website, Internet-connected or web-based application, or other suitable user interface platform. The customer interface 112 may provide, in block 302, a text field for the customer 106 to enter his or her name. In block 304, the customer 106 may enter his or her contact information (e.g., home and work address, email address, telephone number, etc.). In block 306, the customer 106 may enter his or her age. In block 308, the customer may enter his or her gender. In block 310, the customer may enter his or her location. Alternatively, the knowledge management control system 100 may detect the geographical location of the customer based on global positioning system (GPS) data provided by the electronic device 104 or based on the Internet Protocol (IP) address of the electronic device 104. In block 312, the customer 106 may enter preferences related to products or services provided by the business 110, or may otherwise provide additional information helpful for effectively and profitably operating the business 110 (e.g., family size, age of children, occupation, medical conditions, dietary restrictions, income, and other general product preferences, etc.).

In one embodiment, some or all of the information provided in the blocks 302-312 is mandatory in order to create a profile and interact with the knowledge management server 102. In other embodiments, some or all of the information provided in the blocks 302-312 is optional and not required to create a customer profile and to interact with the knowledge management server 102. In other embodiments, the customer 106 need not create a profile to interact with the knowledge management server 102. The customer profile information provided in blocks 302-312 is stored in the mass storage device 116 and/or memory 120 for future access during interactions between the customer 106 and the knowledge management control system 100.

During the customer 106's interaction with the customer interface 112 (e.g., after the customer 106 creates a profile), the customer interface 112 displays a customer input block 320, in which the customer 106 can provide a question, for example, using natural language. Once the customer 106 enters the question, as will be discussed in more detail below, the knowledge management system 114 receives the question and performs a rules-based analysis to determine how to manage the response most appropriately given the interests of the business 110.

For example, assuming the business 110 provides an online beer distribution marketplace for customer 106 to order beer and have the beer shipped to customer 106, the customer 106 may enter a question into the customer input block 320 related to the beer products sold by the business 110. As illustrated in FIG. 3B, the customer 106 enters the question "what does social media stout taste like?," to ask about the brand or flavor of beer called "Social Media Stout," that is sold by the business 110. The knowledge management system 114 receives the question and, based on the rules analysis discussed in more detail below (including potential business impacts of answering the question provided by the knowledge system 122, and the level of confidence for the answer provided by the knowledge system 122), provides a text-based answer produced by the knowledge system 122 in block 322. The customer 106 can then ask a new question by selecting option 324 to generate a new customer input block 320 for entering a new question. Alternatively, if the customer 106 is satisfied with the question and has no additional questions, the customer 106 may select option 326 to indicate that the customer 106 is finished asking questions using the knowledge management system 114. Additionally, the customer 106 may activate an "ask an agent?" option 328 to initiate an action such as, for example, a text or voice chat session with a live human agent of the business 110.

As shown in FIG. 3C, in some instances, the knowledge management system 114 may determine that, in the interest of the business 110, the question entered into the customer input block 320 should not be answered using the knowledge system 122, and instead the customer 106 should be connected to an agent of the business 110. For example, as illustrated in FIG. 3C, the customer may want to cancel their order or take some other action that may harm the profitability of the business 110 by entering the question "how do I cancel all my beer orders?" The knowledge management system 114 determines that the customer 106 should be connected with an agent of the business 110, who may have the training and experience to counsel the customer 106 not to cancel their order. Accordingly, the knowledge management system 114 displays a selectable option, in block 330, for the customer 106 to select in order to initiate a communication session with a live human agent. Alternatively, the customer 106 can cancel the question by selecting the option 326, or initiate a new question by selecting option 328.

Figure 3D:
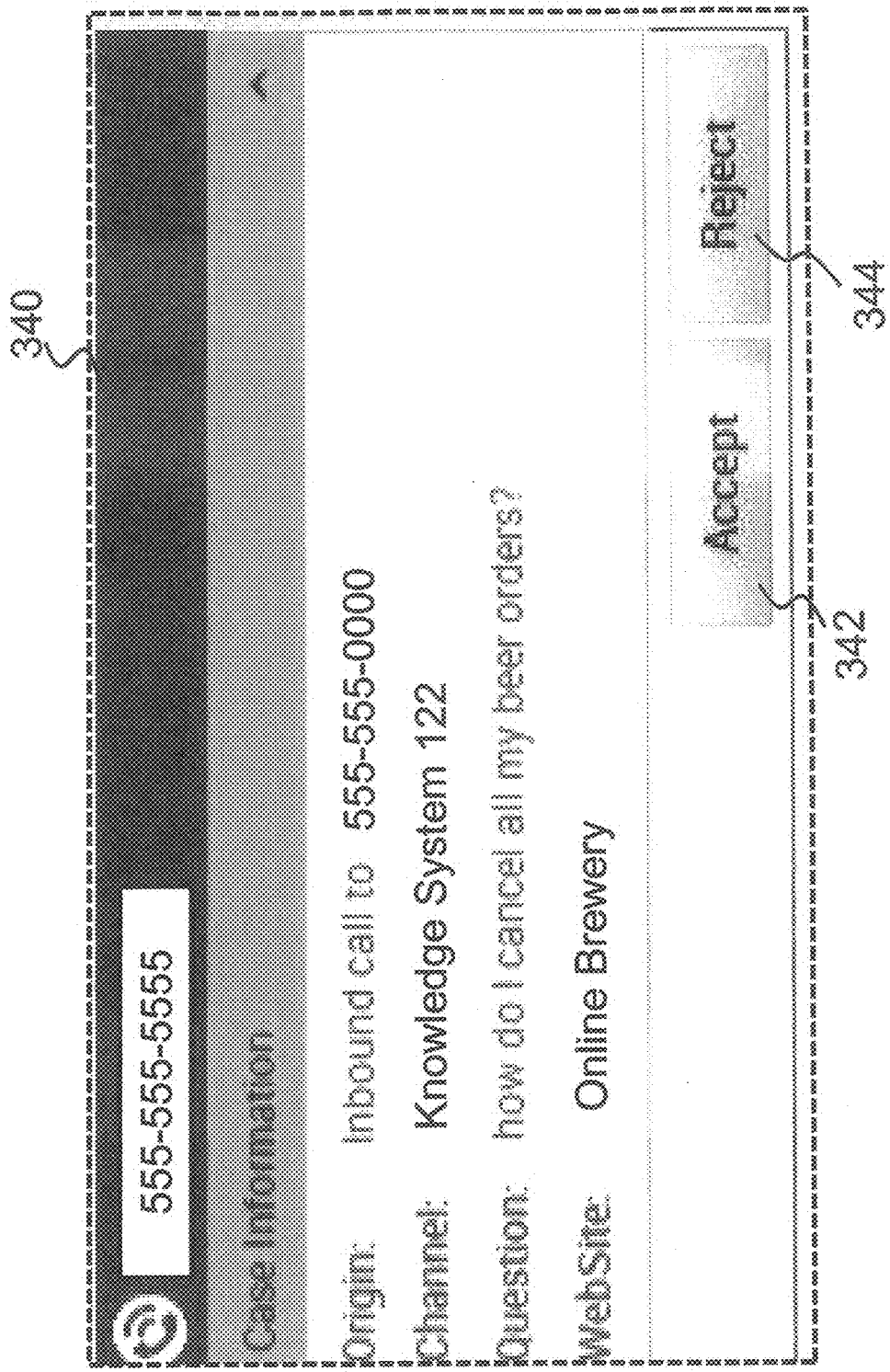

In response to the customer 106 initiating a communication session with a live human agent, the knowledge management system 114 provides an agent interface 340, illustrated in FIG. 3D, which may be displayed on one of the agent devices 238 (e.g., as a website or application desktop interface), to escalate the communication to a live human agent. The knowledge management system 114 may display the question asked by the customer 106 as well as the relevant website, and offer the agent the opportunity to accept the communication with the customer by selecting the option 342 or to reject the communication by selecting the option 344.

In response to the agent selecting to accept the communication, the knowledge management system 114 displays, within the agent interface 340, the case information regarding the customer 106 and the question in block 346. The knowledge management system 114 additionally displays the question history in block 348, including the current question and answer in block 350, as well as all previous questions and answers relating to the current communication session with the customer 106 in block 352. Additionally, the knowledge management system 114 provides an interface to the knowledge system 122 for the agent in block 354, in which the agent can ask questions of (and receive automated responses from) the knowledge system 122 during the communication with the customer 106. Accordingly, the agent is provided with information for assisting the customer 106 with their question, and also relevant profile and history information regarding the customer 106 so that the agent can better facilitate achieving the interests of the business 110.

Figure 4:
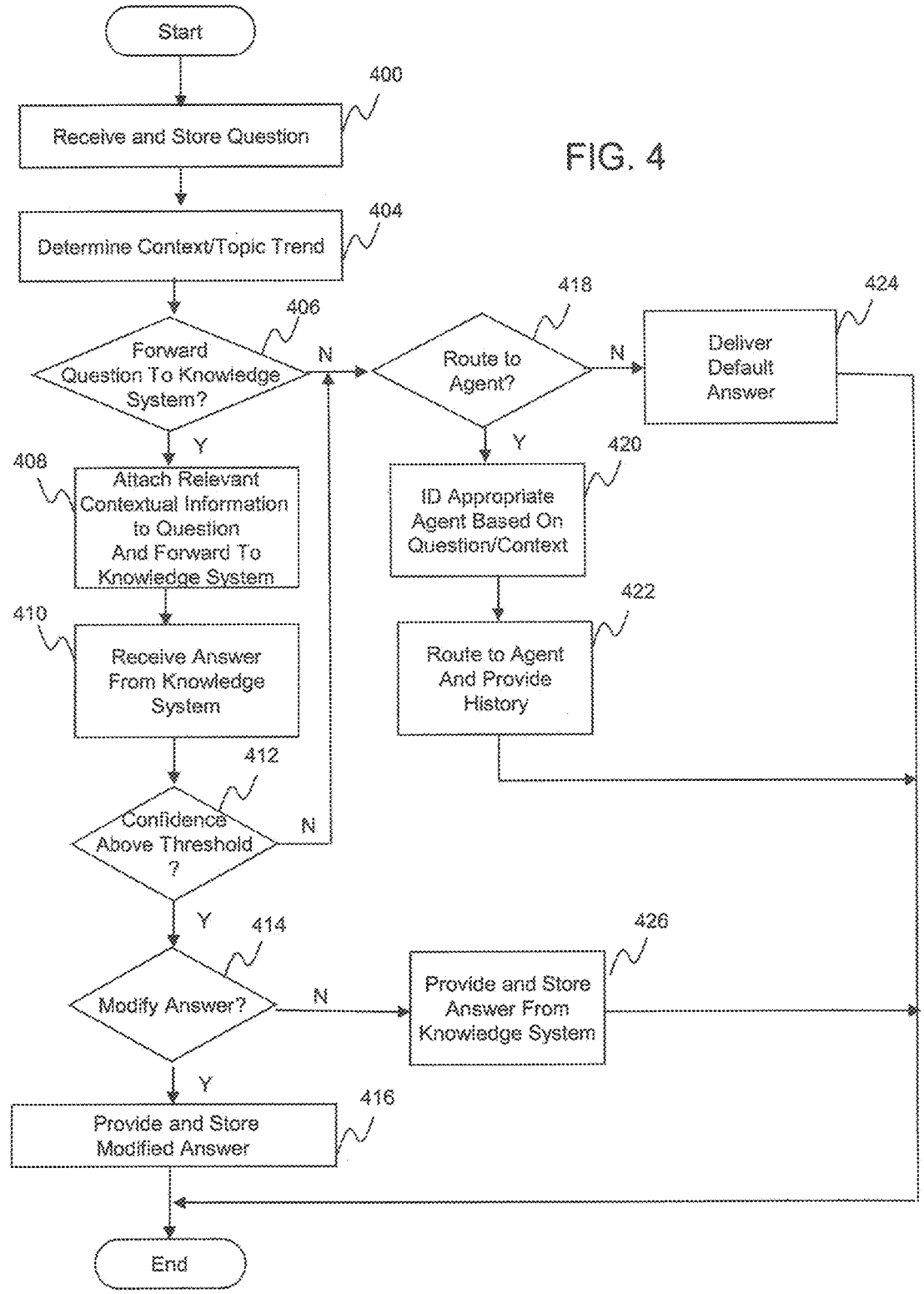
FIG. 4 illustrates a process for performing a rules-based analysis for responding to a customer's question according to embodiments of the present invention.

FIG. 4 illustrates a process for performing a rules-based analysis for determining whether and how to provide an answer to a customer's question, and whether or not to route a communication with the customer to an agent, according to embodiments of the present invention. The process starts and, at block 400, the knowledge management system 114 receives and stores questions or communications from users or customers interacting with the knowledge management system 114 via a communication interface (e.g., an input block or text field in a web or internet-based web form, or a chat-based communication interface). At block 404, the knowledge management system 114 determines a context, and/or topic trend of the questions, if any, based on the words of the question and any additional contextual information, such as information about the customer, or previous questions that the customer has already asked during the interaction, using a suitable text or voice analytics system or algorithm to interpret the question provided by the customer.

For example, the system may determine who the customer is, where the customer is located, the customer's age, the customer's preferences related to certain products or services, or any other relevant information related to the customer and their relationship to products and/or services. A customer may, for example, ask questions about the cost or duration of shipping a particular product, for which the customer's location may be helpful for responding to such questions. A customer may also have certain profile characteristics (e.g., whether they are open to receiving promotional offers, whether they are available for participating in surveys, previous products or services that were purchased in the past, age, gender, demographic information, etc.) that may be helpful for determining answers to questions based on the context of the customer.

Additionally, the topic trend of a series of questions may be inferred, at block 404, based on the substance of the questions collectively, even though the intent of the customer may not be obvious when looking at a single question in isolation. By monitoring a series of questions, the knowledge management system 114 may determine that the topic trend of the questions implies an intent or interest on the part of the customer to take an action that would be contrary to the business objectives of the business 110. For example, in the context of a service provider (e.g., a telecommunications company), a customer may first ask the knowledge management system 114 what features their plan includes. Next, the customer may ask how much their service plan costs per month. Next, the customer may ask how much a competitor charges for a similar plan. Finally, the customer may ask how long the customer's contract lasts. Based on the series of questions, the knowledge management system 114 may determine that the customer is considering cancelling their service and/or switching to a competitor's service, and that, rather than answering all of the questions, the business interests of the business 110 would be better served by routing the communication to a human agent who can address the customer's concerns with their plan and perhaps provide the customer with certain discretionary incentives to remain with the business 110 instead of switching to a competitor.

Additionally, as discussed, the topic trend of the history of the questions and comments can be used to identify or group the questions within a broader topic to provide additional contextual information for future questions. For example, complaints about a product that was delivered being the wrong size or color, or arrived too late, could be grouped within the broad topic of "shipping complaints," which may facilitate the knowledge system 122 in providing answers helpful for resolving shipping complaints, or may inform an agent regarding the customer's concerns.

Once the question is received and stored at block 400 and context, and/or topic trend information (collectively referred to as contextual information) is determined at block 404, the knowledge management system 114 determines, at block 406, whether to forward the question and additional contextual information to the knowledge system 122 based on criteria set according to business rules. For example, in some circumstances, the knowledge management system 114 may determine that, rather than sending the question directly to the knowledge system 122, the business 110 operating the knowledge management system 114 may benefit more by routing the customer to an agent or employee of the business 110.

For example, based on the substance of the question and the contextual information related to the customer and the question, the knowledge management system 114 may determine that the customer wishes to cancel their service or order, or may have certain complaints about products or services, for which it may be helpful to escalate the interaction to a human agent instead of passing the question to the knowledge system 122. The human agent may be trained to diffuse customer frustrations, or may have the authority to make certain customer-relations judgment calls regarding compensating a customer for previous product or service mishaps. In other circumstances, the knowledge management system 114 may prefer to display a predefined default answer to certain questions, without passing the question through the knowledge system. Thus, in order to determine whether to forward the question to the knowledge system at block 406, the knowledge management system 114 may evaluate the question and the contextual information and compare the question and contextual information with information stored in memory to determine whether the question, in view of the contextual information, is established as a question to not send to the knowledge system. In some embodiments, such escalation to a live agent may be transparent from the perspective of the customer such that the customer is not aware that he or she is communicating with a non-human prior to escalation, and is not aware of the transition to a live human.

In one embodiment, the criteria for determining to not obtain an automated response from the knowledge system 122 includes predicting whether the customer appears to want to cancel the order of a product or service, complain about a product or service, or otherwise appears to be unsatisfied with a product or service. If, based on the contextual information of the question and the substance of the question, the knowledge management system 114 determines, for example, that the customer wishes to take an action that would negatively impact the business or would terminate a customer relationship (e.g., by cancelling an order), the knowledge management system 114 may determine that the question does not satisfy a criteria for transmitting the question to the knowledge system 112, and instead may decide to route the communication to an agent.

If the knowledge management system 114 decides, at block 406, to forward the question to the knowledge system 122 to obtain an automated response to the question from the knowledge system 122, the knowledge management system 114 attaches relevant contextual information to the question and transmits the question and the contextual information to the knowledge system 122 at block 408. According to one embodiment, attaching the relevant contextual information to the question does not change the structure of the question based on the context of the question. However, the contextual information may facilitate a better or more informative response from the knowledge system 122. For example, if a customer who is a 26 year old female is logged into their account for an online clothing merchant and asks a question about types of shoes that are available under a certain price point, the context of the customer's age and gender may be provided to the knowledge system 122 in addition to the customer's question, to provide a list of shoes that may be desirable to a 26 year old female, as opposed to merely a list of all shoes that are under the certain price point. Thus, the knowledge system 122 may be able to provide an answer that is more helpful based on the contextual information than it would be without the contextual information.

In one embodiment, the contextual information may include information received from other sources (e.g., social networks, product review websites, news articles, etc.) regarding the products or services provided by the business, which may facilitate a more appropriate or tailored answer to the question, or may be helpful in determining whether to escalate the communication to an agent. For example, if the knowledge system 122 receives information that a product is highly rated by consumers, then the answer provided by the knowledge system 122 may include the ratings or may have a higher level of confidence. Additionally, if consumers have complained about the product on social media networks, the knowledge management system 114 may determine that the question should be escalated to an appropriately-skilled agent who can explain the advantages of the product to the customer.

In one embodiment, the contextual information may include attributes about the customer to influence the quality of the answer received by the knowledge system 122. For example, information about how long they have been a customer, or how much they spend per month, where they live, may be helpful in determining whether certain product or service upgrades are available to the customer.

The knowledge system 122 receives the question and contextual information and provides an answer or response to the question to the knowledge management system 114, along with an indication of a level of confidence regarding the accuracy of the answer or response. The determinations of the level of confidence by the knowledge management system 114 may be according to any conventional mechanism known in the art. Thus, at block 410, the knowledge management system 114 receives an answer from the knowledge system 122 in response to the question and the contextual information.

In some embodiments, the business 110 operating the knowledge management system 114 may not want to provide the answer received by the knowledge system 122 to the customer if the confidence level of the of the knowledge system regarding the accuracy of the answer falls below a pre-defined threshold. For example, the knowledge system 122 may indicate a percentage level of confidence, and the knowledge management system 114 may determine, based on pre-configured settings, that answers falling below 50% are too low to provide the answer to the customer. After all, if the confidence level of the accuracy of the answer is low, the answer may be incorrect or misleading to the customer, and may be ineffective or even harmful to the business 110 in terms of providing appropriate products or services to the customer. Accordingly, in some embodiments, at block 412, the knowledge management system 114 determines whether or not the confidence level regarding the accuracy of the answer received from the knowledge system 122 is above a pre-defined threshold.

If the confidence level is above the pre-defined threshold, the knowledge management system 114 determines, at block 414, whether or not to modify the answer provided by the knowledge system 122, before providing the answer to the customer. For example, some answers provided by the knowledge system 122 may be very long or complex, and therefore, the system may truncate the answer to a more easily understood or digestible form for the customer. Furthermore, based on the contextual information surrounding the question (e.g., customer profile information, the broader topic of the question as determined at block 404, etc.), the knowledge management system 114 may highlight or emphasize the text of certain parts of a long and detailed answer to help the customer focus on aspects of the answer that they may find particularly helpful or relevant.

At block 416, if the knowledge management system 114 decides to modify the answer, the knowledge management system 114 provides the modified answer to the customer (e.g., by display or delivery to the customer's end-user device or computer system by way of text, audio, and/or video output), and additionally stores the modified answer in memory for subsequent analysis regarding the particular questions and answers related to particular customers, or more broadly related to particular products, services, etc.

If the knowledge management system 114 decides, at block 414, not to modify the answer received by the knowledge system (e.g., because the answer is sufficiently informative, succinct, and/or appropriate to the contextual information related to the question), the knowledge management system 114 provides the answer received from the knowledge system 122 to the consumer and also stores the answer in memory for subsequent analysis.

Returning to block 412, if the confidence level of the accuracy of the response received from the knowledge system is below a pre-determined threshold, then the knowledge management system 114 proceeds to block 418 to determine whether or not to escalate the communication to a human agent. Similarly, if the knowledge management system 114 determines, at block 406, that the question asked by the customer is not appropriate for sending to the knowledge system 122, then the knowledge management system 114 proceeds to block 418 to determine whether or not to escalate the communication to a human agent.

If, at block 418, the knowledge management system 114 decides to route the communication to a human agent, the knowledge management system 114 identifies, at block 420, an appropriate agent based on the question that was asked and the contextual information related to the question. If the knowledge management system 114 determines that the topic of the question (e.g., cancelling service, unhappy customer, complicated technical question, etc.) is one that is best handled by a human agent, the knowledge management system 114 routes the communication to an agent that is available and appropriately skilled to resolve the questions asked by the customer during block 400. For example, if a customer asks a first question "what is the quality of the camera for my cell phone?" and then asks "how do I cancel my contract?," the knowledge management system 114 may identify and route the customer 106 to an agent that is trained with the technical features of the customer's phone and also regarding the features of competitors' phones and service plans so that the agent may discuss the advantages of not cancelling the contract. Accordingly, by storing the series of questions and answers, the knowledge management system 114 may be able to make more effective routing decisions to connect customers with appropriately skilled agents.

At block 422, the knowledge management system 114 routes the communication to the appropriate agent and additionally provides the history of the questions asked by the customer, and also relevant contextual information related to the question or the customer for display on the agent's terminal. For example, if a customer asked whether their services can be upgraded, the knowledge system 122 many not be able to appropriately answer the question, particularly if the knowledge system 122 is a general purpose knowledge system operated by a third party. Thus, the question may be escalated to an agent, and providing the history of the question to the agent at block 422 may enable the agent to better understand the customer's concerns and avoid frustration on the part of the customer.

According to some embodiments of the present invention, the customer may be unaware that he or she is engaging in a communication with the knowledge management system 114 prior to escalation to a live agent. For example, the customer may initial engage in a communication with the knowledge management system 114 via a chat communication interface until the knowledge management system 114 determines (e.g., at block 406 or block 412) to escalate the chat communication to a live human agent in a chat or voice communication session. The customer may be unaware that he or she is communicating with a non-human prior to the escalation, and the agent to whom the communication is routed may be enabled to seamlessly continue the communication based on the earlier chat history and the customer profile such that the customer is unaware of the transition to the live human agent.

If, however, at block 418, the system decides not to route the communication to a human agent, the knowledge management system 114 displays or delivers a default answer to the customer at block 424. For example, because the knowledge system 122 may be operated and maintained by a third party entity, there may be periods of time where the knowledge system 122 is experiencing downtime for maintenance, upgrades, or other reasons, and therefore, it is not possible or practical to forward the customer's question to the knowledge system 122. Nonetheless, the question may be simple or may unnecessarily consume limited agent resources if routed to a human agent, and therefore the knowledge management system 114 may simply deliver a default message or answer to the customer rather than routing the communication to a human agent. More broadly, there may be circumstances where answering the question using the knowledge system 122 may not be in line with the business objectives of the knowledge management system 114, but it may also be inappropriate or inefficient to consume limited human agent resources by routing a communication to a human agent, and therefore a default answer is delivered to the customer at block 424.

Once an answer is provided to the customer at block 416, block 424, or block 426, the process ends. However, the customer may continue asking additional questions by starting the process over, in which case additional questions and answers obtained during the process are saved in memory and associated with the particular customer to facilitate aspects of the process, for example, determining the context, trend, or topic of a series of questions (i.e., contextual information), or ultimately identifying and routing to an appropriate agent trained to answer the questions. Alternatively, when the communication is routed to an agent at block 422, the process ends and the agent can proceed with resolving the customer's questions or issues according to the policies of the business.

Accordingly, embodiments of the present invention operate as a proxy or filter between customers and a knowledge system to provide high quality and efficient service to customers, while maintaining control over the questions provided to the knowledge system and the answers received from the knowledge system. For example, the knowledge management system 114 monitors questions provided by customers for deciding whether to provide the question to the knowledge system 122. Additionally, the knowledge management system 114 monitors, answers and/or sequences of answers provided by the knowledge system 122 and determines whether the answers align with the business objectives of the business 110. The knowledge management system 114 performs an analysis on the substance of the question (e.g., based on the text or voice analysis of the question) to determine the intent of the question and/or answer or a sequence of questions and/or answers, and to determine whether or not the answer provided by the knowledge system 122 should be delivered to the customer, or instead an alternative communication is warranted (e.g., by providing a default, truncated, or modified answer, or escalating the communication to an agent.

Thus, according to example embodiments of the present invention, the business 110 operates as a medium or bridge between the customer 106 and the knowledge system 122, by monitoring questions and answers or chat communications, storing the questions and answers or chat communications in memory, and performing an analysis regarding the appropriate response to the question, series of questions, or chat communications that aligns with the business objectives of the business. In some embodiments, the response may include escalating a communication between a customer and the knowledge management system to a live agent, where the level of confidence regarding an automated response is below a threshold level, or where escalating to a live agent aligns with the business interests of the business 110. In some embodiments, such escalation may be transparent from the perspective of the customer such that the customer is unaware of any transition from a communication (e.g., chat communication) with a computer-based system to a communication (e.g., chat or voice communication) with a live human agent. Accordingly, the business 110 operating the knowledge management control system 100 may be able to effectively and efficiently provide high quality information, products, and/or services to customers while simultaneously protecting the business interests of the business 110.

Each of the various servers, controllers, switches, gateways, engines, and/or modules (collectively referred to as servers) in the afore-described figures may be a process or thread, running on one or more processors, in one or more computing devices 1500 (e.g., FIG. 5A, FIG. 5B), executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that a computing device may be implemented via firmware (e.g. an application-specific integrated circuit), hardware, or a combination of software, firmware, and hardware. A person of skill in the art should also recognize that the functionality of various computing devices may be combined or integrated into a single computing device, or the functionality of a particular computing device may be distributed across one or more other computing devices without departing from the scope of the exemplary embodiments of the present invention. A server may be a software module, which may also simply be referred to as a module. The set of modules in the contact center may include servers, and other modules.

The various servers may be located on a computing device on-site at the same physical location as the agents of the contact center or may be located off-site (or in the cloud) in a geographically different location, e.g., in a remote data center, connected to the contact center via a network such as the Internet. In addition, some of the servers may be located in a computing device on-site at the contact center while others may be located in a computing device off-site, or servers providing redundant functionality may be provided both via on-site and off-site computing devices to provide greater fault tolerance. In some embodiments of the present invention, functionality provided by servers located on computing devices off-site may be accessed and provided over a virtual private network (VPN) as if such servers were on-site, or the functionality may be provided using a software as a service (SaaS) to provide functionality over the Internet using various protocols, such as by exchanging data using encoded in extensible markup language (XML) or JavaScript Object notation (JSON).

Figure 5A:
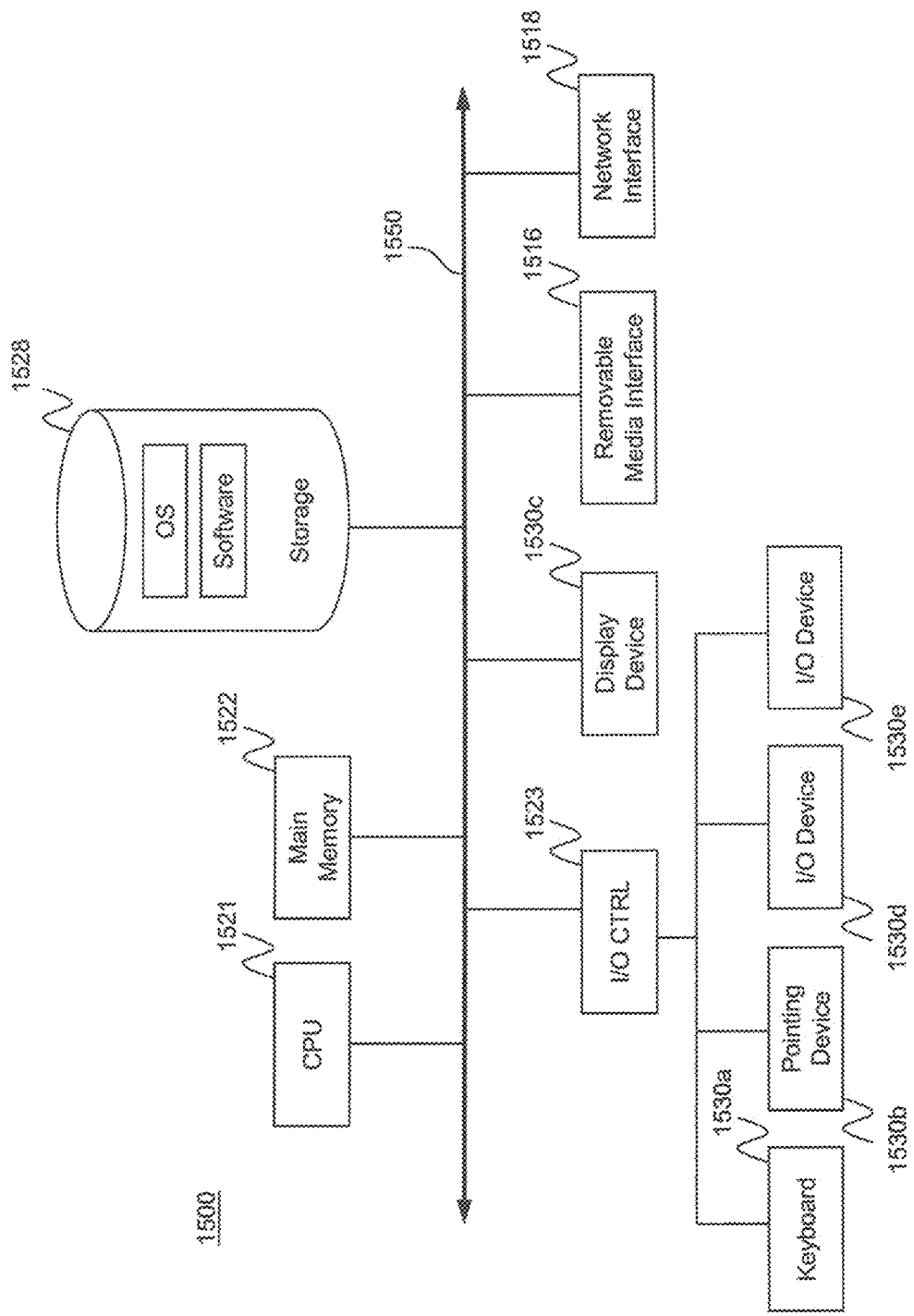
FIG. 5A is a block diagram of a computing device according to an embodiment of the present invention.
Figure 5B:
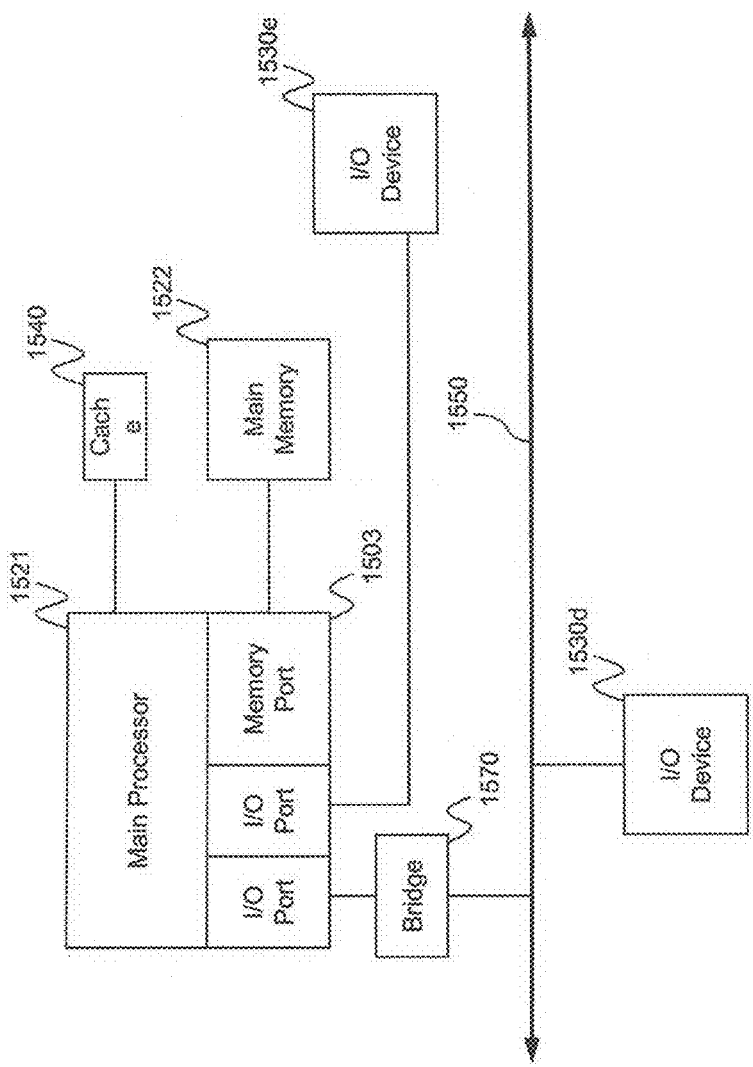
FIG. 5B is a block diagram of a computing device according to an embodiment of the present invention.

FIG. 5A and FIG. 5B depict block diagrams of a computing device 1500 as may be employed in exemplary embodiments of the present invention. Each computing device 1500 includes a central processing unit 1521 and a main memory unit 1522. As shown in FIG. 5A, the computing device 1500 may also include a storage device 1528, a removable media interface 1516, a network interface 1518, an input/output (I/O) controller 1523, one or more display devices 1530*c*, a keyboard 1530*a* and a pointing device 1530*b*, such as a mouse. The storage device 1528 may include, without limitation, storage for an operating system and software. As shown in FIG. 5B, each computing device 1500 may also include additional optional elements, such as a memory port 1503, a bridge 1570, one or more additional input/output devices 1530*d*, 1530*e* and a cache memory 1540 in communication with the central processing unit 1521. The input/output devices 1530*a*, 1530*b*, 1530*d*, and 1530*e* may collectively be referred to herein using reference numeral 1530.

The central processing unit 1521 is any logic circuitry that responds to and processes instructions fetched from the main memory unit 1522. It may be implemented, for example, in an integrated circuit, in the form of a microprocessor, microcontroller, or graphics processing unit (GPU), or in a field-programmable gate array (FPGA) or application-specific integrated circuit (ASIC). The main memory unit 1522 may be one or more memory chips capable of storing data and allowing any storage location to be directly accessed by the central processing unit 1521. As shown in FIG. 5A, the central processing unit 1521 communicates with the main memory 1522 via a system bus 1550. As shown in FIG. 5B, the central processing unit 1521 may also communicate directly with the main memory 1522 via a memory port 1503.

FIG. 5B depicts an embodiment in which the central processing unit 1521 communicates directly with cache memory 1540 via a secondary bus, sometimes referred to as a backside bus. In other embodiments, the central processing unit 1521 communicates with the cache memory 1540 using the system bus 1550. The cache memory 1540 typically has a faster response time than main memory 1522. As shown in FIG. 5A, the central processing unit 1521 communicates with various I/O devices 1530 via the local system bus 1550. Various buses may be used as the local system bus 1550, including a Video Electronics Standards Association (VESA) Local bus (VLB), an Industry Standard Architecture (ISA) bus, an Extended Industry Standard Architecture (EISA) bus, a MicroChannel Architecture (MCA) bus, a Peripheral Component Interconnect (PCI) bus, a PCI Extended (PCI-X) bus, a PCI-Express bus, or a NuBus. For embodiments in which an I/O device is a display device 1530c, the central processing unit 1521 may communicate with the display device 1530c through an Advanced Graphics Port (AGP). FIG. 5B depicts an embodiment of a computer 1500 in which the central processing unit 1521 communicates directly with I/O device 1530e. FIG. SB also depicts an embodiment in which local busses and direct communication are mixed: the central processing unit 1521 communicates with I/O device 1530d using a local system bus 1550 while communicating with I/O device 1530e directly.

A wide variety of I/O devices 1530 may be present in the computing device 1500. Input devices include one or more keyboards 1530a, mice, trackpads, trackballs, microphones, and drawing tablets. Output devices include video display devices 1530c, speakers, and printers. An I/O controller 1523, as shown in FIG. 5A, may control the I/O devices. The I/O controller may control one or more I/O devices such as a keyboard 1530a and a pointing device 1530b, e.g., a mouse or optical pen.

Referring again to FIG. 5A, the computing device 1500 may support one or more removable media interfaces 1516, such as a floppy disk drive, a CD-ROM drive, a DVD-ROM drive, tape drives of various formats, a USB port, a Secure Digital or COMPACT FLASH™ memory card port, or any other device suitable for reading data from read-only media, or for reading data from, or writing data to, read-write media. An I/O device 1530 may be a bridge between the system bus 1550 and a removable media interface 1516.

The removable media interface 1516 may for example be used for installing software and programs. The computing device 1500 may further comprise a storage device 1528, such as one or more hard disk drives or hard disk drive arrays, for storing an operating system and other related software, and for storing application software programs. Optionally, a removable media interface 1516 may also be used as the storage device. For example, the operating system and the software may be run from a bootable medium, for example, a bootable CD.

In some embodiments, the computing device 1500 may comprise or be connected to multiple display devices 1530c, which each may be of the same or different type and/or form. As such, any of the I/O devices 1530 and/or the I/O controller 1523 may comprise any type and/or form of suitable hardware, software, or combination of hardware and software to support, enable or provide for the connection to, and use of, multiple display devices 1530c by the computing device 1500. For example, the computing device 1500 may include any type and/or form of video adapter, video card, driver, and/or library to interface, communicate, connect or otherwise use the display devices 1530c. In one embodiment, a video adapter may comprise multiple connectors to interface to multiple display devices 1530c. In other embodiments, the computing device 1500 may include multiple video adapters, with each video adapter connected to one or more of the display devices 1530c. In some embodiments, any portion of the operating system of the computing device 1500 may be configured for using multiple display devices 1530c. In other embodiments, one or more of the display devices 1530c may be provided by one or more other computing devices, connected, for example, to the computing device 1500 via a network. These embodiments may include any type of software designed and constructed to use the display device of another computing device as a second display device 1530c for the computing device 1500. One of ordinary skill in the art will recognize and appreciate the various ways and embodiments that a computing device 1500 may be configured to have multiple display devices 1530c.

A computing device 1500 of the sort depicted in FIG. 5A and FIG. 5B may operate under the control of an operating system, which controls scheduling of tasks and access to system resources. The computing device 1500 may be running any operating system, any embedded operating system, any real-time operating system, any open source operating system, any proprietary operating system, any operating systems for mobile computing devices, or any other operating system capable of running on the computing device and performing the operations described herein.

The computing device 1500 may be any workstation, desktop computer, laptop or notebook computer, server machine, handheld computer, mobile telephone or other portable telecommunication device, media playing device, gaming system, mobile computing device, or any other type and/or form of computing, telecommunications or media device that is capable of communication and that has sufficient processor power and memory capacity to perform the operations described herein. In some embodiments, the computing device 1500 may have different processors, operating systems, and input devices consistent with the device.

In other embodiments the computing device 1500 is a mobile device, such as a Java-enabled cellular telephone or personal digital assistant (PDA), a smart phone, a digital audio player, or a portable media player. In some embodiments, the computing device 1500 comprises a combination of devices, such as a mobile phone combined with a digital audio player or portable media player.

Figure 5D:
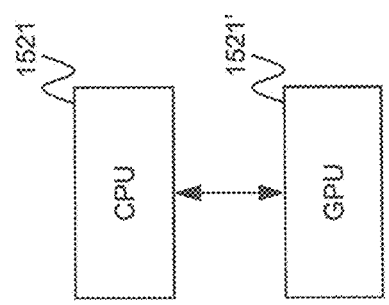
FIG. 5D is a block diagram of a computing device according to an embodiment of the present invention.
Figure 5C:
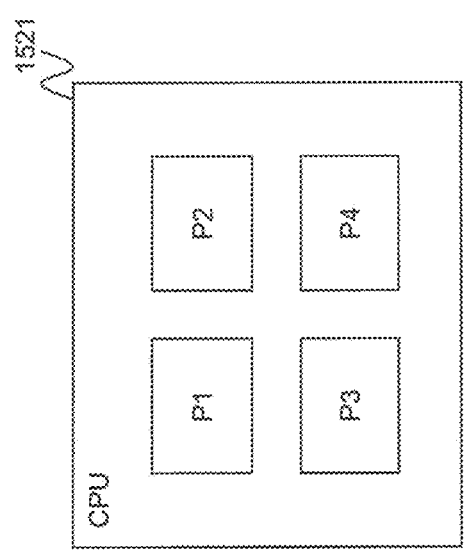
FIG. 5C is a block diagram of a computing device according to an embodiment of the present invention.
Figure 5E:
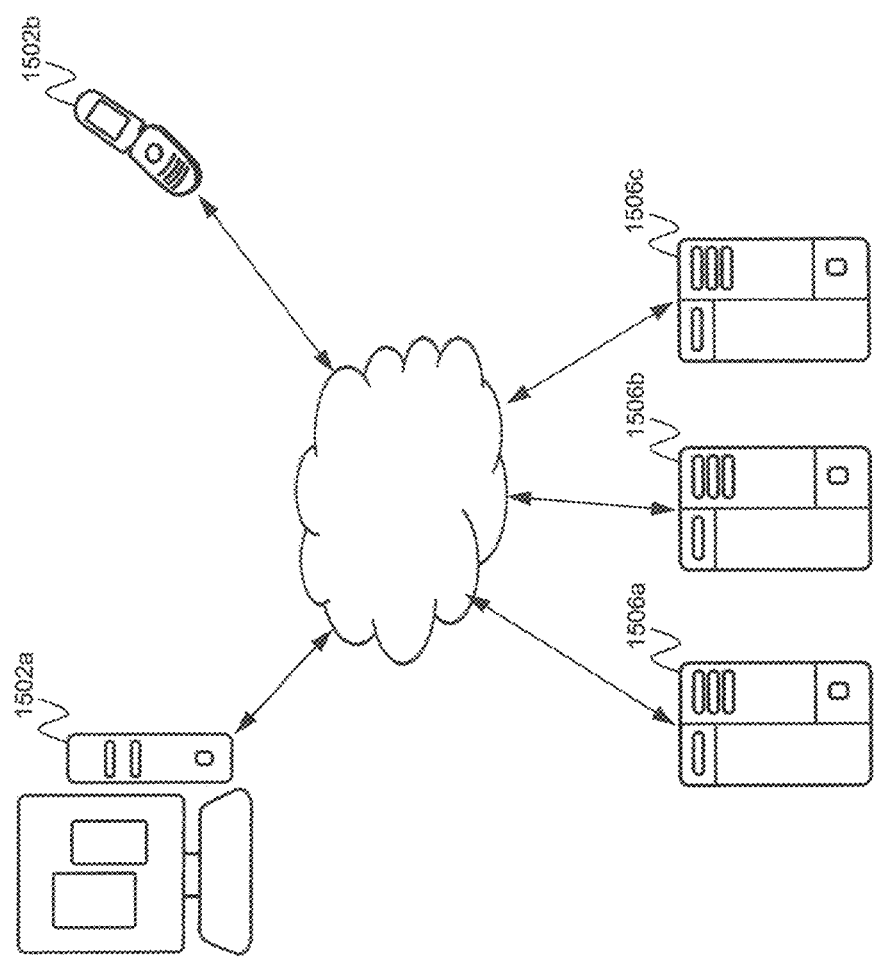
FIG. 5E is a block diagram of a network environment including several computing devices according to an embodiment of the present invention.

As shown in FIG. 5C, the central processing unit 1521 may comprise multiple processors P1, P2, P3, P4, and may provide functionality for simultaneous execution of instructions or for simultaneous execution of one instruction on more than one piece of data. In some embodiments, the computing device 1500 may comprise a parallel processor with one or more cores. In one of these embodiments, the computing device 1500 is a shared memory parallel device, with multiple processors and/or multiple processor cores, accessing all available memory as a single global address space. In another of these embodiments, the computing device 1500 is a distributed memory parallel device with multiple processors each accessing local memory only. In still another of these embodiments, the computing device 1500 has both some memory which is shared and some memory which may only be accessed by particular processors or subsets of processors. In still even another of these embodiments, the central processing unit 1521 comprises a multicore microprocessor, which combines two or more independent processors into a single package, e.g., into a single integrated circuit (IC). In one exemplary embodiment, depicted in FIG. 5D, the computing device 1500 includes at least one central processing unit 1521 and at least one graphics processing unit 1521'.

In some embodiments, a central processing unit 1521 provides single instruction, multiple data (SIMD) functionality, e.g., execution of a single instruction simultaneously on multiple pieces of data. In other embodiments, several processors in the central processing unit 1521 may provide functionality for execution of multiple instructions simultaneously on multiple pieces of data (MIMD). In still other embodiments, the central processing unit 1521 may use any combination of SIMD and MIMD cores in a single device.

A computing device may be one of a plurality of machines connected by a network, or it may comprise a plurality of machines so connected. FIG. 7E shows an exemplary network environment. The network environment comprises one or more local machines 1502a, 1502b (also generally referred to as local machine(s) 1502, client(s) 1502, client node(s) 1502, client machine(s) 1502, client computer(s) 1502, client device(s) 1502, endpoint(s) 1502, or endpoint node(s) 1502) in communication with one or more remote machines 1506a, 1506b, 1506c (also generally referred to as server machine(s) 1506 or remote machine(s) 1506) via one or more networks 1504. In some embodiments, a local machine 1502 has the capacity to function as both a client node seeking access to resources provided by a server machine and as a server machine providing access to hosted resources for other clients 1502a, 1502b. Although only two clients 1502 and three server machines 1506 are illustrated in FIG. 7E, there may, in general, be an arbitrary number of each. The network 1504 may be a local-area network (LAN), e.g., a private network such as a company Intranet, a metropolitan area network (MAN), or a wide area network (WAN), such as the Internet, or another public network, or a combination thereof.

The computing device 1500 may include a network interface 1518 to interface to the network 1504 through a variety of connections including, but not limited to, standard telephone lines, local-area network (LAN), or wide area network (WAN) links, broadband connections, wireless connections, or a combination of any or all of the above. Connections may be established using a variety of communication protocols. In one embodiment, the computing device 1500 communicates with other computing devices 1500 via any type and/or form of gateway or tunneling protocol such as Secure Socket Layer (SSL) or Transport Layer Security (TLS). The network interface 1518 may comprise a built-in network adapter, such as a network interface card, suitable for interfacing the computing device 1500 to any type of network capable of communication and performing the operations described herein. An I/O device 1530 may be a bridge between the system bus 1550 and an external communication bus.

According to one embodiment, the network environment of FIG. 7E may be a virtual network environment where the various components of the network are virtualized. For example, the various machines 1502 may be virtual machines implemented as a software-based computer running on a physical machine. The virtual machines may share the same operating system. In other embodiments, different operating system may be run on each virtual machine instance. According to one embodiment, a "hypervisor" type of virtualization is implemented where multiple virtual machines run on the same host physical machine, each acting as if it has its own dedicated box. Of course, the virtual machines may also run on different host physical machines.

Other types of virtualization is also contemplated, such as, for example, the network (e.g. via Software Defined Networking (SDN)). Functions, such as functions of the session border controller and other types of functions, may also be virtualized, such as, for example, via Network Functions Virtualization (NFV).

Although this invention has been described in certain specific embodiments, those skilled in the art will have no difficulty devising variations to the described embodiment, which in no way depart from the scope and spirit of the present invention. Furthermore, to those skilled in the various arts, the invention itself herein will suggest solutions to other tasks and adaptations for other applications. It is the applicant's intention to cover by claims all such uses of the invention and those changes and modifications which could be made to the embodiments of the invention herein chosen for the purpose of disclosure without departing from the spirit and scope of the invention. Thus, the present embodiments of the invention should be considered in all respects as illustrative and not restrictive, the scope of the invention to be indicated by the appended claims and their equivalents rather than the foregoing description.

What is claimed is:

1. A system for knowledge system management, the system comprising:
   a processor; and
   a memory coupled to the processor, wherein the memory has stored thereon instructions that, when executed by the processor, cause the processor to:
      receive a question from a customer;
      determine whether to not the question satisfies a first criterion for obtaining an automated response to the question, wherein the first criterion comprises a determination confirming that the customer does not wish to terminate a customer relationship;
      in response to determining that the question satisfies the first criterion, transmit the question to an external knowledge system configured to receive questions as input and generate automated responses to the questions;
      receive the automated response to the question from the external knowledge system;
      determine whether or not the automated response satisfies a second criterion for providing the automated response to the customer; and
      in response to determining that the automated response satisfies the second criterion, transmit the automated response to an electronic device operated by the customer.

2. The system of claim 1, wherein the instructions further cause the processor to determine contextual information regarding the question.

3. The system of claim 2, wherein the contextual information comprises a topic trend of the question.

4. The system of claim 2, wherein the contextual information comprises stored profile information regarding the customer.

5. The system of claim 2, wherein the instructions further cause the processor to transmit the contextual information to the external knowledge system along with the question.

6. The system of claim 1, wherein the second criterion comprises a confidence level for an accuracy of the automated response being above a predetermined threshold.

7. The system of claim 6, wherein the instructions further cause the processor to route a communication link with the electronic device operated by the customer to an agent device in response to determining that the automated response does not satisfy the second criterion.

8. The system of claim 1, wherein the second criterion comprises the automated response being shorter than a predetermined length.

9. The system of claim 1, wherein the instructions further cause the processor to route a communication link with the electronic device operated by the customer to an agent device in response to determining that the question does not satisfy the first criterion.

10. A method for knowledge system management, the method comprising:
   receiving, by a processor, a question from a customer;
   determining, by the processor, whether to not the question satisfies a first criterion for obtaining an automated response to the question, wherein the first criterion comprises a determination confirming that the customer does not wish to terminate a customer relationship;
   in response to determining that the question satisfies the first criterion, transmitting, by the processor, the question to an external knowledge system configured to receive questions as input and generate automated responses to the questions;
   receiving, by the processor, the automated response to the question from the external knowledge system;
   determining, by the processor, whether or not the automated response satisfies a second criterion for providing the automated response to the customer; and
   in response to determining that the automated response satisfies the second criterion, transmitting, by the processor, the automated response to an electronic device operated by the customer.

11. The method of claim 10, further comprising determining, by the processor, contextual information regarding the question.

12. The method of claim 11, wherein the contextual information comprises a topic trend of the question.

13. The method of claim 11, wherein the contextual information comprises stored profile information regarding the customer.

14. The method of claim 11, further comprising transmitting, by the processor, the contextual information to the external knowledge system along with the question.

15. The method of claim 10, wherein the second criterion comprises a confidence level for an accuracy of the automated response being above a predetermined threshold.

16. The method of claim 15, further comprising routing, by the processor, a communication link with the electronic device operated by the customer to an agent device in response to determining that the automated response does not satisfy the second criterion.

17. The method of claim 10, wherein the second criterion comprises the automated response being shorter than a predetermined length.

18. The method of claim 10, further comprising routing, by the processor, a communication link with the electronic device operated by the customer to an agent device in response to determining that the question does not satisfy the first criterion.

* * * * *